Figure 1:
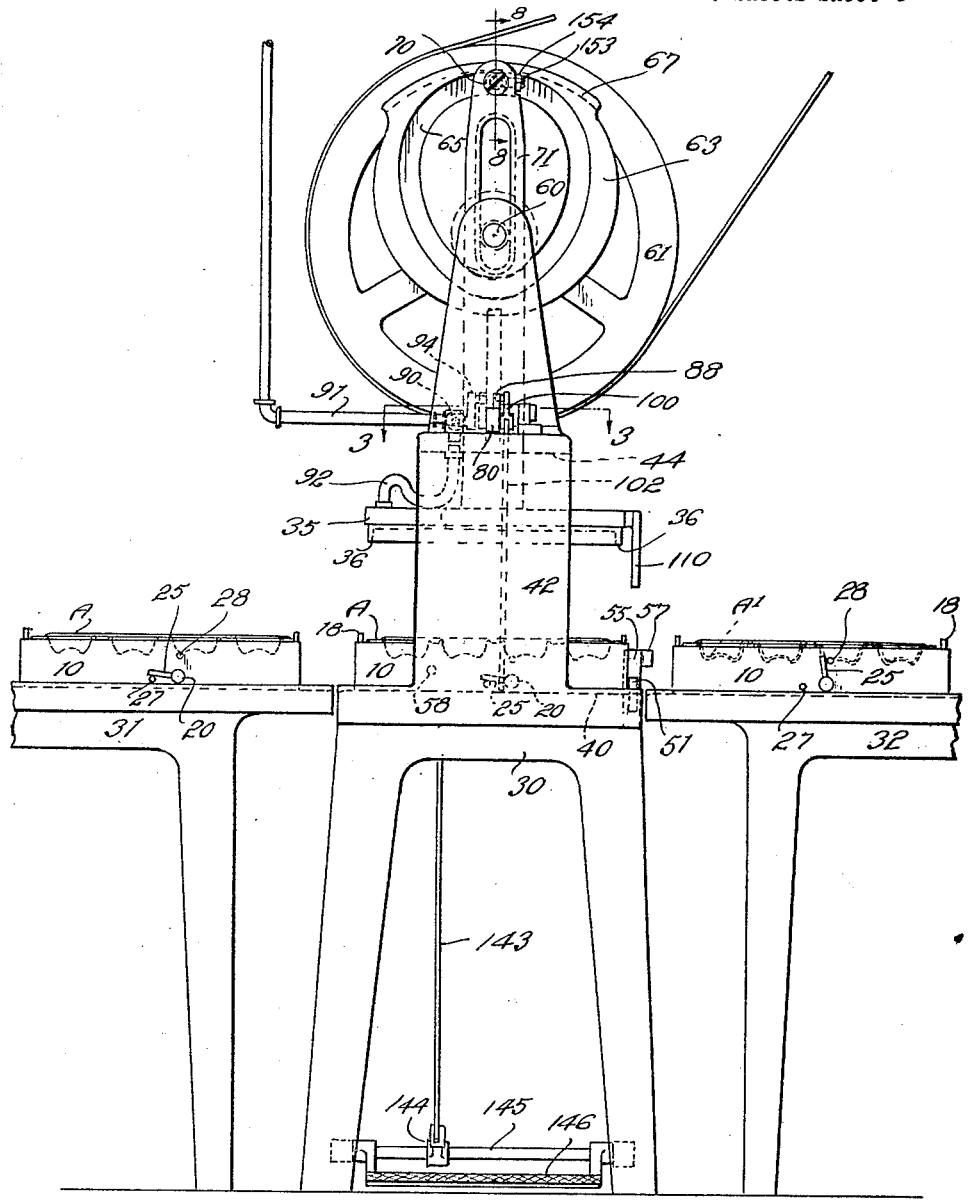

Feb. 23, 1926.  
A. H. BATES  
1,574,015  
APPARATUS FOR FORMING HOLLOW ARTICLES OF PLASTIC MATERIAL  
Filed August 20, 1923 5 Sheets-Sheet 1

INVENTOR
Albert H Bates
By Baker Macklin
ATTORNEYS

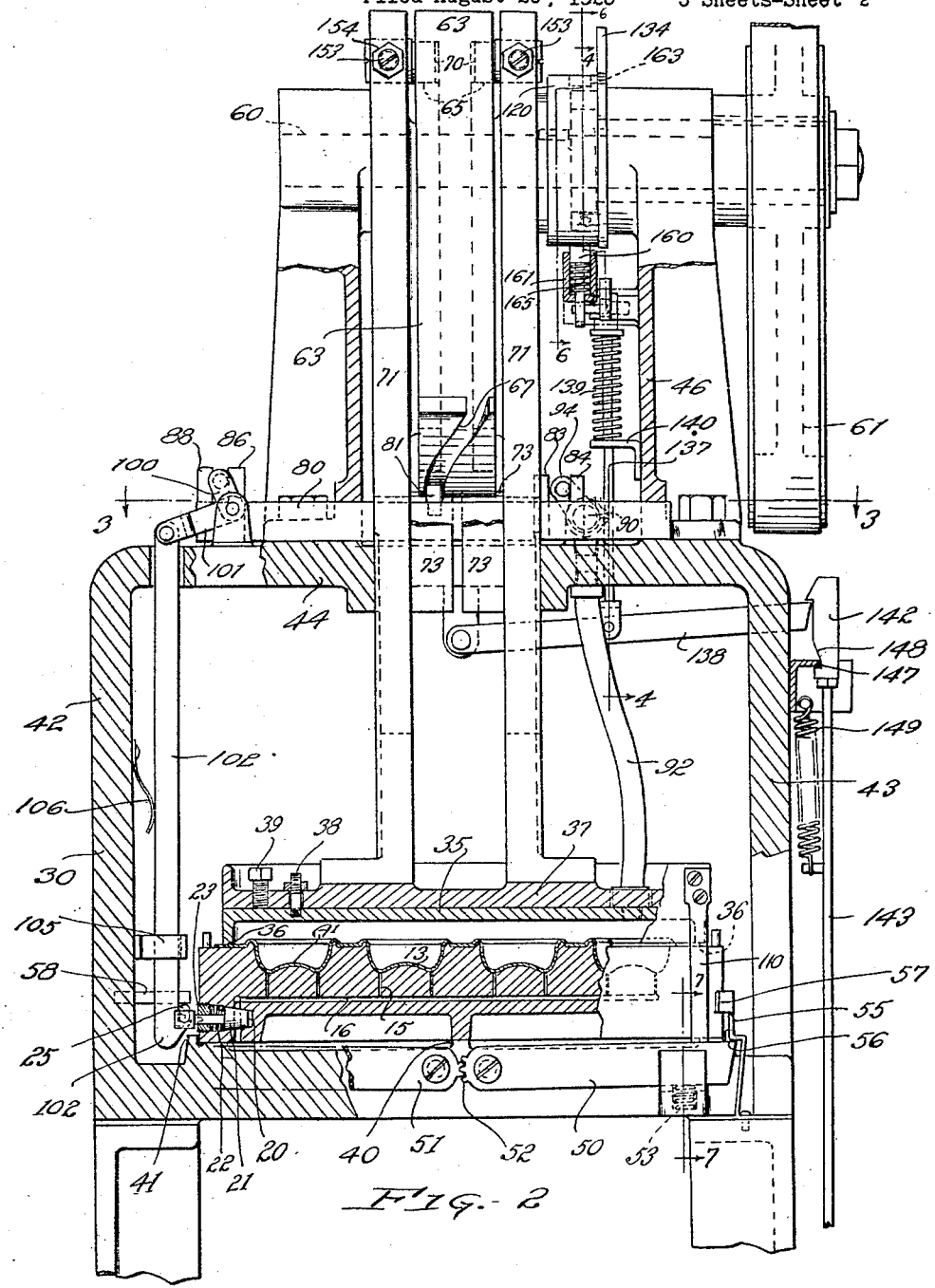

Feb. 23, 1926.   1,574,015
A. H. BATES
APPARATUS FOR FORMING HOLLOW ARTICLES OF PLASTIC MATERIAL
Filed August 20, 1923    5 Sheets-Sheet 3
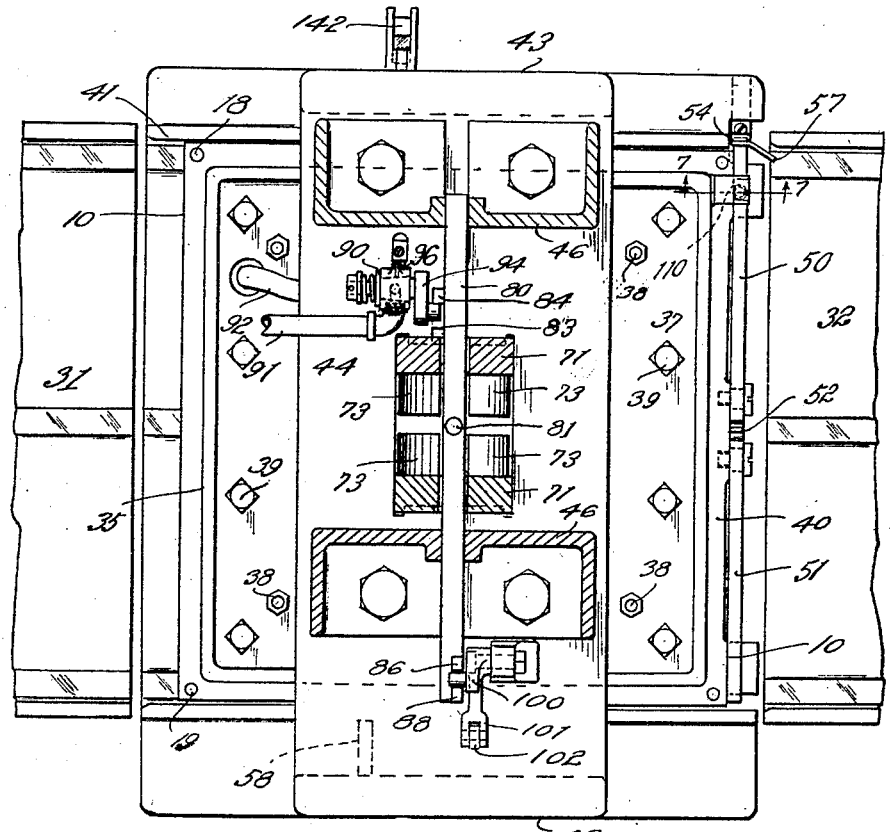
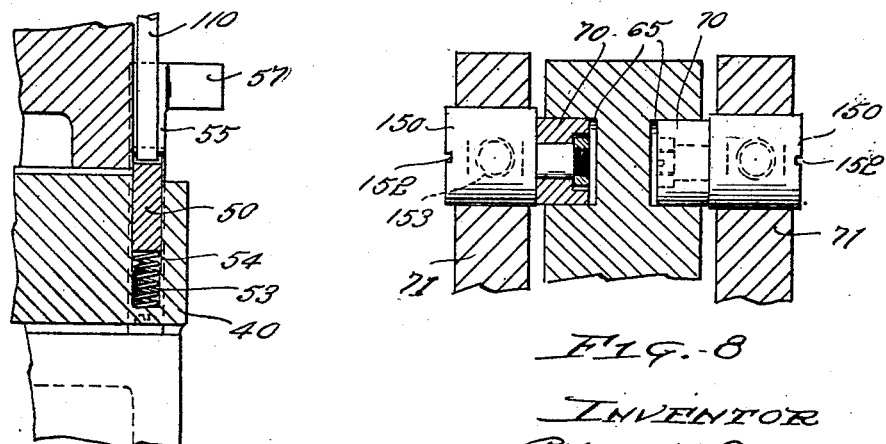

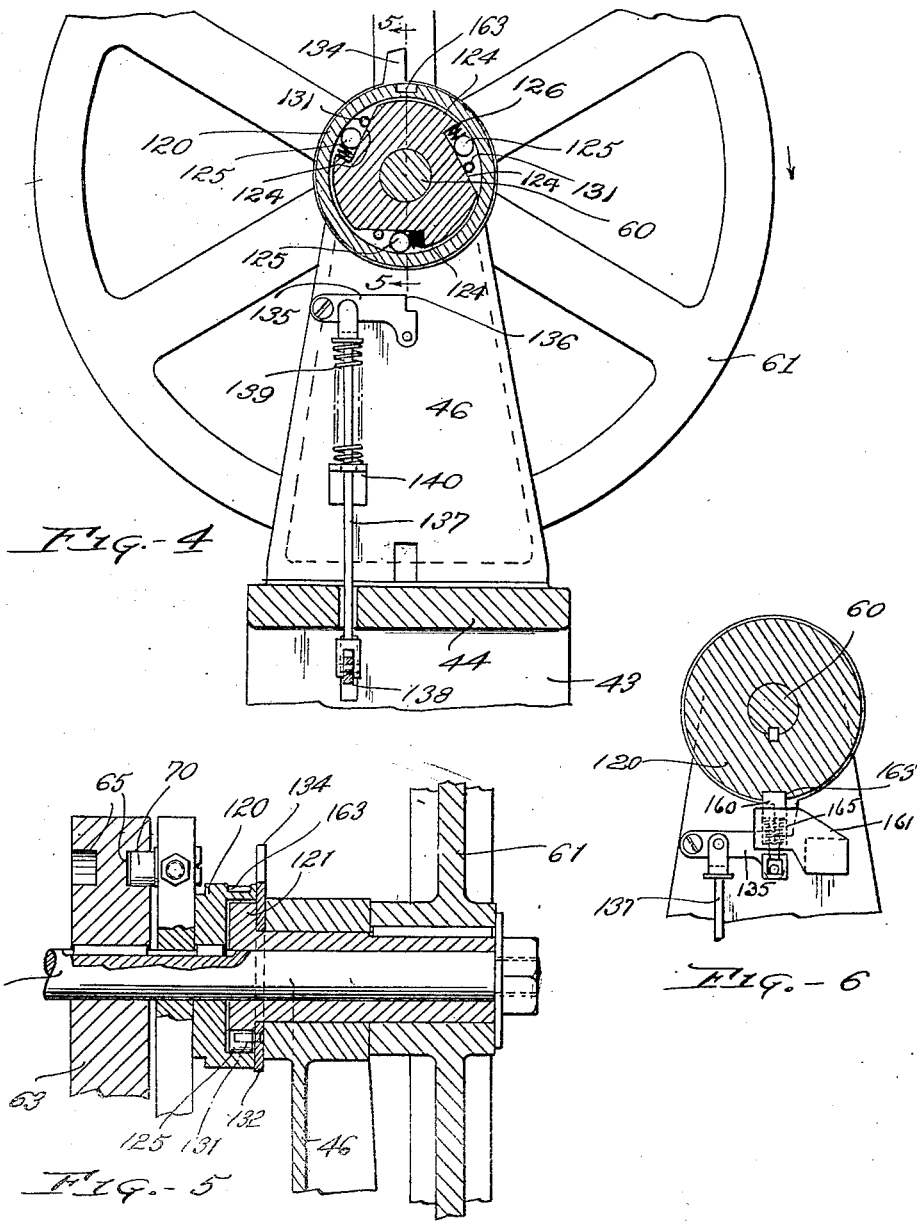

Feb. 23, 1926. 1,574,015
A. H. BATES
APPARATUS FOR FORMING HOLLOW ARTICLES OF PLASTIC MATERIAL
Filed August 20, 1923. 5 Sheets-Sheet 5

INVENTOR
Albert H. Bates
By Bates & Macklin
ATTORNEYS

Patented Feb. 23, 1926.

1,574,015

UNITED STATES PATENT OFFICE.

ALBERT H. BATES, OF CLEVELAND HEIGHTS, OHIO, ASSIGNOR TO PARAMOUNT RUBBER CONSOLIDATED, INCORPORATED, OF LITTLE FALLS, NEW JERSEY, A CORPORATION OF DELAWARE.

APPARATUS FOR FORMING HOLLOW ARTICLES OF PLASTIC MATERIAL.

Application filed August 20, 1923. Serial No. 658,271.

*To all whom it may concern:*

Be it known that I, ALBERT H. BATES, a citizen of the United States, residing at Cleveland Heights, in the county of Cuyahoga and State of Ohio, have invented a certain new and useful Improvement in an Apparatus for Forming Hollow Articles of Plastic Material, of which the following is a full, clear, and exact description, reference being had to the accompanying drawings.

The object of this invention is to provide a simple and efficiently operating apparatus for the rapid formation of hollow articles of plastic material. My apparatus is of that type wherein the stock is seated pneumatically in mold cavities, thus doing away with the necessity for plungers for seating the stock and various expedients for holding it in place.

Heretofore, where pneumatic seating has been employed, the seating was usually effected between two mold members, one of which was inverted and which were in a hydraulic press, and following the seating such members have been brought together to form a seam and shear off the surplus stock. There have been disadvantages and time lost in seating the stock effectively against the under surface of the inverted mold where the molds were secured in a press, and in placing the molds in the press where they were independent.

It is an object of my invention to reduce the time loss and provide a very rapidly operating mechanism for pneumatically seating sheet stock, as well as simple means for retaining it in seated position until the joining operation is completed. I accomplish this by providing a press into which a mold may be readily slid face upward, the press being equipped with a cover adapted to be quickly lowered over the mold and engage the margin of plastic stock thereon and make an air-tight connection therewith, there being provision for admitting fluid under pressure into the cover, which automatically seats the stock in the cavities. The closing of a valve on the vents from the mold cavities then pneumatically retains the stock seated until after the mold is released from this press and has been utilized in the joining press.

In carrying out my invention on a commercial scale, the attendants may place raw rubber sheet-stock on the face of multiple cavity molds and these may be fed one after the other to the seating press, which will be operated to seat the stock in such mold, after which the mold with the rubber lined cavities will be discharged and conveyed to the proper place, where one mold will be placed on top of another and the two placed in the hydraulic press to form the seam on the stock and shear off the surplus material.

My invention is hereinafter more fully explained in connection with the drawings, which show one embodiment thereof, and the essential features are summarized in the claims.

Figure 9:
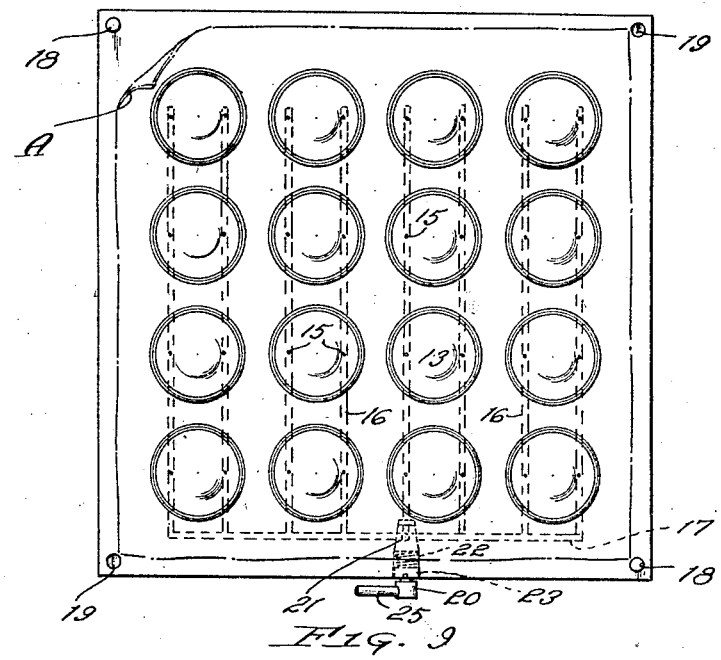
Figure 10:
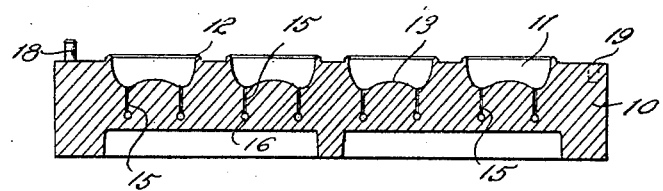
Figure 11:
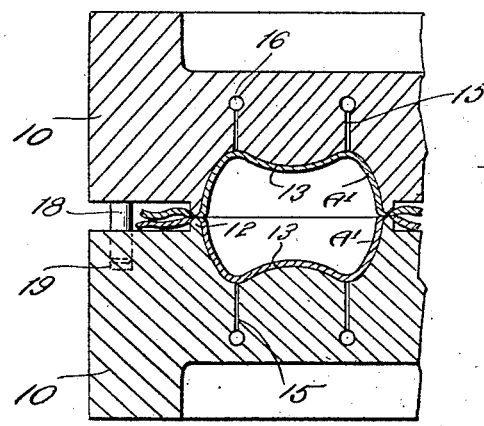

In the drawings, Fig. 1 is a front elevation of the seating press and adjacent portions of the complete apparatus; Fig. 2 is an enlarged vertical section through the press at right angles to Fig. 1; Fig. 3 is a horizontal section through the apparatus on the plane indicated by the line 3—3 of Figs. 1 and 2; Fig. 4 is a vertical section as indicated by the line 4—4 on Fig. 2; Fig. 5 is a detail of the clutch shown, being a section on the line 5—5 on Fig. 4; Fig. 6 is a detail of locking mechanism, being a vertical section on the line 6—6 on Fig. 2; Fig. 7 is a detail of the movable stop for the mold, being a vertical section on the line 7—7 on Fig. 2; Fig. 8 is a detail illustrating an adjustment for the cam rollers operating the mold-cover, being a vertical section on the line 8—8 on Fig. 1; Fig. 9 is a plan of one of the molds, showing a sheet of plastic stock lying thereon; Fig. 10 is a cross section through such mold; Fig. 11 is a cross section through cooperating portions of two of the mold members as brought together to join the stock.

The particular molds shown in Figs. 9, 10 and 11 are especially designed for making hollow rubber balls, but it is to be understood that the apparatus is equally adaptable for hollow articles of other form or material. As shown, the mold comprises a block 10 having in its upper portion a series of upwardly facing cavities 11 each surrounded by an annular raised cutting edge 12. Each cavity is provided with one or more vents 15 which lead downwardly to transverse passageways 16 common to a row of cavities, and these transverse passageways terminate in a header passageway 17. A single valve in the header passageway, may thus control the vents from all of the cavities.

As shown, the mold valve 20 is of the plug quarter-turn type and comprises a tapered plug 21 seated in a corresponding cavity in the mold base and pressed to its seat by a spring 22 which bears against a suitable collar 23 which is secured to the mold and embraces the shank of the plug. On this shank is a suitable handle 25. The plug has a diametric passageway, so that when the handle is in its down or substantially horizontal position, as shown in the left hand portion of Fig. 1, the vents are all open. When the handle is nearly vertical as shown in the right-hand portion of Fig. 1, the vents are all closed. Suitable stops as for example, the pins 27 and 28 limit the movement of the handle.

Fig. 9 illustrates, at A, a sheet of rubber lying across all of the cavities. As hereinafter explained, my apparatus clamps this sheet about the margin and subjects the interior region to an air pressure above the atmospheric while the valve 20 is open. This seats the rubber in the cavities, as indicated at $A^1$ in Fig. 2. Then the valve 20 is closed and the rubber will remain in this position indefinitely after air pressure has been removed. Now if two of the molds, with their cavities thus lined with rubber are placed one on the other and brought together, the annular edges 12 operate to form an effective seam and at the same time cut off the surplus stock as indicated in Fig. 11. Suitable dowel pins as 18 carried by one of the mold members, cooperate with the cavities 19 in the other member to accurately position the two mold members in this joining operation.

It may be noted that the cavities 11 shown in the drawings have humps 13 in their lower portions, which are effective in reducing the stretch of the rubber as it is seated, giving a more uniform wall, and also thereafter providing for relief of the internal pressure which was caused by the reduction in cubical content of the hollow article, due to the molds having approached a distance substantially equal to two thicknesses of the rubber after the two sheets of rubber have touched and confined the contents. This feature however, is no part of the present invention, but is covered in Reissue Patent No. 14,604, granted March 4, 1919, to The Aranar Company, as assignee of Fred Thomas Roberts. So far as my invention is concerned, this feature may be employed or omitted as desired.

Referring now to Fig. 1, it will be seen that a suitable press, the frame of which is designated 30, is mounted between two tables or other supports 31 and 32. On the table 31 is a mold 10 on which a sheet of rubber A has been laid. This mold is then shifted from the left toward the right into the press into the position indicated at 10 therein, as hereinafter explained in detail. A suitable rectangular cover or chamber 35 is caused to be lowered until its marginal edge 36 engages the marginal portion of the rubber sheet A. Then compressed air, or other fluid under pressure, is supplied to the interior of the cover while the vents from the mold are open, thus seating the sheet stock in the cavities by fluid pressure. The mold-valve is then closed and the mold is shoved out to the right as indicated by the mold 10 on the table 32, the stock being retained seated in the cavities as indicated at $A^1$.

While I have shown simply tables 31 and 32 along which the molds are shoved manually toward and from the press, it is to be understood that any suitable propelling means may be employed for intermittently feeding the molds along the supports and into and from the press; for instance, an endless belt conveyer synchronized with the press might be used. Or, if desired, the molds might rest on a series of rollers or the table 31 might be inclined toward the press and the table 32 is slightly away from it to give a gravity feed toward and from the press. Any suitable means may be employed for supporting the molds outside of the press as well as for moving them into and out of the press, and all such supporting and conveying means are intended to be conventionally indicated by the tables 31 and 32 as shown.

I will now describe the particular sheet-seating press shown in Figs. 1 to 8 inclusive.

Carried by the press frame 30, is a suitable horizontal support 40 along which the mold may be slid or otherwise moved into place between guiding ribs 41. A suitable stop is provided to limit the forward movement of the mold as it is moved to position. The stop shown comprises a pair of pivoted bars 50 and 51 which are geared together adjacent their pivots as indicated at 52 and are normally pressed upwardly above the plane of the support 40 by a suitable spring 53. The bars stand in a groove 54 in the support 40. The mold may be shoved manually or otherwise, into the press until it is arrested by abutting these stop bars. Upon the seating operation, the bars are automatically lowered from the mold, as hereinafter explained.

As the mold is slid into the press, if the handle 25 of the vent-valve is not already down in the open position, as shown at the left-hand in Fig. 1, it is automatically turned into that position by engaging with a stationary pin 58 carried by the upright 42 of the press. This insures the vents being open when the press is operated.

The press has a pair of upright standards 42 and 43, connected by a horizontal plate portion 44. Mounted on the plate 44 are standards 45 and 46 in the upper portion of which is journaled a shaft 60, loosely carrying a belt pulley 61 or other suitable means for rotating it. Keyed to this shaft is a compound multiple cam 63. This cam is shown as having on its opposite faces, two annular cam grooves 65. These grooves are occupied by rollers 70 on the inner faces of a pair of upright slidable bars 71. The bars 71 carry, at their lower end, the mold cover 35 and are intermediately guided by sliding through an opening in the horizontal web 44 of the press frame.

Suitable clutching mechanism hereinafter described is adapted to couple the drive pulley with the shaft so that as the pulley 61 is rotated, the mold cover 35 will be lowered and thereafter returned to idle position. When lowered, it engages the marginal edge portion of the rubber sheet A lying on the mold. It is caused to dwell in this position for a material fraction of the rotation by reason of the cam grooves 65 being concentric for a distance, and during this dwell, a valve is automatically opened to admit fluid under pressure to the interior of the mold cover; shortly thereafter, and still during the dwell, the vent valve 25 is automatically operated to close the vents; then the pressure valve is closed, which through a drainage opening in the valve releases the pressure in the cover.

The cover is effectively held down on the mold throughout the period in which the pressure is applied, by means of the cylindrical periphery of the cam 63 which is angularly coextensive with the concentric portion of the groove 65 and engages bosses 73 formed on the inner sides of the bars 71 and having upper surfaces concaved with the same curvature as the periphery of the cam. As hereinafter explained the air is caused to enter the cover when the cylindrical peripheral portion of the cam is down, and at this time it is engaging the bosses 73 and thus effectively resisting the upward thrust caused by the air pressure.

After the seating of the stock, and the closing of the mold vents and pressure valve, a portion of the cam 65 of decreasing radius raises the mold cover to initial position. The movement described also causes the mold stop to be depressed, as hereinafter explained, so that at the completion of the press stroke the mold is released ready to be shoved out to the right.

To adjust the air cover with relation to the stroke of the apparatus, whereby it may make a tight connection with rubber of different thicknesses, I mount it on the lower ends of the bars 71 in such manner that it may be moved slightly toward and from the ends of the bars. To effect this I secure the ends of these bars rigidly to a plate 37 which overlies the cover; I suspend the cover to the under side of this plate by studs 38 rising from the cover and extending loosely through the top plate and carrying nuts, and I mount in the top plate 37 a number of set screws 39 which may be turned down tightly against the top of the cover. In making the adjustment the cam is turned down to lower the cover to the bottom of the stroke, then the clearance between it and the top mold is adjusted according to the thickness of the rubber to be used by means of the set screws 39 and the nuts on the stud 38, these nuts pulling the cover tightly against the ends of the positioning set screws. It should be understood however, that the amount of penetration of the marginal sheet by the edge 36 of the mold cover may vary considerably. Accordingly, a nicety of adjustment of the air-cover height with reference to the mold is not necessary.

To actuate the pressure valve, as well as to close the mold valve automatically, I provide the following mechanism. Slidably mounted on top of the frame web 44 is the transverse bar 80 having in its central region an upwardly extending pin 81. This pin is adapted to be engaged by a cam groove 67 on the periphery of the cam 63. This groove can only act when the mold cover is in engagement with the rubber on the mold. The engagement of the cam 67 with the pin 81 shoves the bar 80 toward the left as shown in Fig. 2. In this movement, the first effective operation is to open the valve 90 between the supply pipe 91 leading from a compressed air tank (or other source of fluid under pressure) and a flexible hose 92 leading to the mold cover. This is readily effected by providing a crank arm 94 on the shank of the pressure valve which has a crank pin lying between two lugs 83 and 84 on the bar 80.

About the same time with the opening of the pressure valve a lug 86 on the bar 80 engages a pin on the bell crank 100 and the arm 101 thereof shoves downwardly the hooked link 102 which, by reason of a loose guide 105 at the lower end thereof and a spring 106 pressing the bar toward the mold, bears against the handle 25 of the open mold valve and cams itself backwardly until its hooked end passes beneath the handle. During the time this release bar 102 was thus being brought into position to engage the mold valve, the compressed air or other fluid passes into the mold cover and seats the rubber stock in the mold cavities. Then as the cam 63 continues to rotate, the cam groove 67 moves the bar 80 backwardly to initial position, and in this movement the lug 88 engages the pin on the bell crank 100 and pulls up the latch bar 102 which has been standing beneath the valve handle 25. This turns the valve into closed position. Shortly thereafter the lug 83 on the bar 80 closes the pressure valve 90, and releases the pressure within the cover, this valve having a vent 96 like an ordinary stop-and-waste cock. After that, the portion of the cam 65 of decreasing radius lifts the mold cover from the sheet.

Referring to the stop for positioning the mold: As the mold cover is reaching its lowermost position, a bar 110 carried thereby engages the stop bar 50 and shoves it down to idle position, and this bar rocks the stop bar 51 to idle position. Then a spring detent 55 springs over the depressed bar 50 and holds these bars down. This spring detent is shown in Fig. 2 as having a shoulder 56 adapted to engage the adjacent bar 50 and hold it. This is the condition of the bars when the mold cover has returned to initial position.

The seating operation being now completed, it is only necessary to shove the mold out of the press. In such movement, the mold engages the inclined end 57 of the spring detent 55 and cams it back away from the bar 50. The bar however at that time is beneath the mold and cannot rise. When the mold, in being shoved onto the table 32, clears the press, the locking bar 50 swings up under the influence of the spring 53 and this swings up the bar 51, thus forming an effective stop limiting the advance movement of the next mold shoved into the press.

It is convenient to control the press by a single-rotation clutch which when released will allow the press to make one cycle of operation. To effect this, I have shown the following mechanism:

Keyed on the shaft 60 to which the cam 63 is keyed, is a clutch member 120 having an annular flange. Loose on the shaft is the clutch member 121, which is within the flange of the member 120 and has a sleeve portion 122 to which the driving pulley 61 is keyed. The clutch member 121 has suitable notches 124 in its peripheral portion, the bases of which make an acute angle to the tangent to the periphery at the point of intersection. In these notches are rollers 125 which when they occupy the deepest portion of the notch are idle, but when occupying the shallower parts will engage both the clutch members and bind them together. Suitable springs 126 tend to force these rollers into binding position. The rollers are normally held inactive by pins 131 on an annular member 132 journalled on the sleeve 122 and capable of a slight rotative movement thereon. The member 132 has an arm 134 which normally engages a shoulder 136 on the stop-arm 135.

Upon the withdrawal of the stop arm 135 by any suitable mechanism, the clutch springs 126 seat the clutch rollers 125 against both clutch members and thereupon the cam 63 and the controlling ring 132 rotate with the driving pulley 61. Then the return of the stop arm at any time during the rotation presents an abutment in the path of the clutch arm 134 and causes the disengagement of the clutch at the end of the rotation.

A convenient means for withdrawing the stop arm 135 and allowing it thereafter to immediately return to active position is illustrated in Figs. 2 and 4. A link 137 leads downwardly from the pivoted stop arm 135 and is connected at its lower end to the lever 138. A spring 139 surrounding the link and compressed between a shoulder thereon and a stationary bracket 140 tends to raise the link and arm. The extreme end of the lever 138 is engaged by a hooked block 142 on the upper end of a link 143 which is shown as connected at its lower end to the rock arm 144 mounted on the rock shaft 145, which carries a treadle 146. The block 142 is provided with a cam surface 148 bearing against a stationary shoulder 147 and adapted to cause the block to move out of engagement with the lever 138 when the block is lowered. A suitable spring 149 draws the link 143 upwardly and also inwardly toward the shoulder 147.

It results from the construction described that if the treadle is depressed, the block 142 is drawn downwardly and draws downwardly the lever 138 and then clears that lever. The downward movement of the lever 138 swinging the arm 135 out of the way of the clutch arm 134, and thereupon the clutch springs 126, seat the clutch rollers as described. After the hooked end of the block 142 clears the lever 138, the spring 139 raises the link 137, thus returning the stop arm 135 to normal position. This however, is after the clutch arm 134 has moved out of range of the stop arm. The clutch thereafter continues engaged for the rest of the rotation, but, at the end of the rotation, the clutch arm strikes on the shoulder 136 and thus carries the clutch rollers to idle position, releasing the clutch.

It will be seen that a depression of the treadle causes a single rotation of the cam with the consequent fluid-pressure seating operation described. It is immaterial however, how long the operator holds the treadle down, as the cam will make just one rotation. To initiate the succeeding rotation, the operator allows the treadle to return to position, (which he naturally does some time during the rotation) and then the treadle is ready for depression, to initiate a succeeding rotation as soon as a fresh mold is in position.

It is desirable to make the cam rollers 70 adjustable so that when the bars 71 are moved thereby into their lowermost position the peripheral surface of the cam 63 will just clear the bosses 73 though the edges of this peripheral surface are preferably slightly relieved or cammed inwardly. To effect this adjustment, I have shown each roller 70 as carried by an eccentric stud 150 which is rotatably mounted in the corresponding bar 71. This stud is provided with a screw-driver slot 152 by which it may be rotated. A suitable set screw 153 and jam nut 154 locks the roller in adjusted position.

It is desirable to provide means to lock the cam in its uppermost or idle position to prevent inadvertent displacement when the clutch is disengaged. I effect this by any suitable mechanism as for instance by that illustrated in Figs. 2 and 6. As there shown, a suitable locking bolt 160 is slidably mounted in a bracket 161 carried by the frame standard 46. This bolt is normally pressed toward the clutch member 120 by a spring 165, and when the cam is in its uppermost position is adapted to enter a notch 163 in the clutch member and lock the parts. The bolt is connected to the stop arm 135 which releases the clutch. Accordingly, when this arm is drawn down to initiate the cycle of movement, the bolt 160 is likewise withdrawn from the notch 163. Whenever the stop-arm is raised the bolt tends to rise under the influence of the spring 165 but simply bears idly against the periphery of the clutch member 120 until the notch 163 comes opposite it, whereupon it springs into the notch and prevents further rotation.

It will be understood from the above description that sheet rubber stock may be seated in mold cavities by my apparatus with great rapidity. It is only necessary for the attendants to place the sheets of rubber on top of the molds and for such molds to be fed one after the other in the press and for the operator of the press to actuate the treadle to cause the machine to perform its cycle of operations, after which the mold with its cavities rubber-lined is shoved out. The moving of the mold into the press and out of the press as well as feeding other molds with the unseated rubber toward the press, and advancing the completed molds may all be readily effected by a suitable intermittently-actuated conveyer synchronized with the operation of the press, so that raising movement of the mold cover automatically feeds out of the press the mold with the seated stock and feeds into the press a new mold ready for seating.

It is noted that the portable mold itself, provided with the vented cavities and a valve for opening and closing them is claimed in my divisional application Serial No. 738,842 filed September 20, 1924.

I claim:

1. In an apparatus of the character described, the combination of a cavitary mold, a hollow member adapted to coact with the mold outside of the cavity, mechanism for causing said mold and hollow member to approach each other to clamp a sheet of material across the cavity and then to separate, and mechanism operated automatically while the stock is clamped for admitting fluid under pressure into said member.

2. In an apparatus of the character described, the combination of a cavitary mold, a hollow member having a closed top and an open bottom adapted to coact with the mold outside of the cavity, mechanism for causing said mold and hollow member to approach each other to clamp a sheet of material across the cavity, mechanism for admitting fluid under pressure into said member, and means for automatically closing a vent from the cavity of the mold when the stock is seated.

3. In an apparatus of the character described, the combination of a cavitary mold, a hollow member adapted to coact with the mold outside of the cavity, mechanism for causing said mold and hollow member to approach each other to clamp a sheet of material across the cavity, and mechanism for automatically admitting fluid under pressure into said member, a vent leading from said cavity, and means for automatically opening and closing said vent.

4. In an apparatus of the class described, the combination of means for supporting a cavitary mold member, a chamber member for fluid under pressure having an open face, mechanism for moving one of said members to position said chamber against a plastic sheet extending across the mold cavity, there being a vent from said cavity, a valve for controlling said vent and means operated by the positioning mechanism for automatically closing said valve.

5. The combination of a cavitary mold, a chamber having an open face of such dimensions relative to the mold that it may coact with the mold face outside of the cavity, said mold having a vent from the cavity and having an openable and closable valve for controlling said vent, a conduit leading to said chamber, and an openable and closable valve in said conduit, mechanism for causing the chamber to coact with the mold, and mechanism for opening the valve in the mold vent and for opening the valve in said conduit and thereafter closing the valve in the conduit and closing the valve in the mold vent after the valve in the conduit is opened.

6. The combination with a mold, of a chamber adapted to coact therewith to bind plastic material to the mold in a region surrounding the molding surface, mechanism for reciprocating one of such members toward and then from the other to clamp the stock and thereafter free it, a conduit leading to the chamber and a valve in said conduit, and mechanism for automatically opening the valve and thereafter closing it, both while the chamber is holding the stock against the mold.

7. The combination with a mold, of a chamber adapted to coact therewith to bind plastic material to the mold in a region surrounding the molding surface, mechanism for reciprocating one of such members toward and then from the other to clamp the stock and thereafter free it, a conduit leading to the chamber and a valve in said conduit, mechanism for automatically opening the valve and thereafter closing it, both while the chamber is holding the stock against the mold, said mold having a vent and a valve for controlling the vent, adapted to stand in either open or closed position, and mechanism for insuring that the vent valve be open before the admission of fluid to the chamber, and mechanism for closing the vent valve after the admission of fluid to the chamber.

8. In an apparatus of the character described the combination of a press having a reciprocable chamber with an open face, means for positioning a mold opposite said face, a cam for reciprocating the chamber toward and from the mold, means for operating the cam, a conduit leading to the chamber, a valve in said conduit and means actuated automatically by the cam operating means for closing the valve.

9. In an apparatus of the character described, the combination of a press having a reciprocable chamber with an open face, means for positioning a mold opposite said face, means for reciprocating the chamber toward and from the mold, a conduit leading to the chamber, a valve in said conduit, and a cam for opening and closing said valve.

10. In an apparatus of the character described, the combination of a cavitary mold, a hollow member adapted to coact with the mold outside of the cavity, a cam for causing said mold and hollow member to approach each other to clamp a sheet of material across the cavity and hold it clamped for a material time, and mechanism for admitting fluid under pressure into said member while the cam is holding it in clamping position, a vent leading from said cavity, and means for automatically opening and closing said vent.

11. The combination of a press having a support for a mold, a chamber having an open face bounded by an edge adapted to coact with the mold face outside of the molding region, a reciprocable member carrying the chamber, mechanism for causing such reciprocation, a conduit leading to the chamber, a valve therein, mechanism for opening and closing the valve, and a clutch for controlling the two mechanisms mentioned.

12. The combination of a press having a support for a mold, a chamber having an open face bounded by an edge adapted to coact with the mold face outside of the molding region, a reciprocable member carrying the chamber, a cam for causing such reciprocation, a conduit leading to the chamber, a valve therein, a cam for opening and closing the valve while the moving action of the first cam is idle, and a clutch for controlling the movement of the two cams.

13. The combination with a press having a support for a mold, of a chamber, a member for carrying the same and guiding it whereby the chamber may reciprocate toward and from the mold, a cam acting on said member to cause such reciprocation, a conduit leading to the chamber, a valve in the conduit, a slidable bar for operating the valve, and a cam for moving said bar.

14. The combination with a press having a support for a mold, of a chamber, a member for carrying the same and guiding it whereby the chamber may reciprocate toward and from the mold, a cam acting on said member to cause such reciprocation, a conduit leading to the chamber, a valve in the conduit, a valve carried by the mold and controlling a vent therefrom, mechanism connected with both the valve in the conduit and the valve in the vent, and a cam for operating said mechanism to open and close the valve in the conduit and to close the valve in the vent after the valve in the conduit is opened.

15. The combination of a press adapted to support a mold, a movable stop to limit the position of the mold when inserted in the press, a chamber, mechanism for causing the mold and chamber to coact and thereafter admitting fluid under pressure to the chamber and for thereafter removing the chamber from the mold, and means for removing the stop from active position.

16. The combination of a press adapted to support a mold, a member having an edge adapted to coact with the marginal portion of the mold, a stop limiting the positioning movement of the mold into the press, and mechanism for moving said member toward the mold, and thereafter from the mold, and automatically acting mechanism for moving the stop to idle position whereby the mold may be moved out of the press.

17. The combination of a press having means to support a mold, a stop to limit the positioning movement of the mold in the press, a chamber having an open face, mechanism for moving it toward and from the mold to coact therewith, an abutment movable with the chamber to move the stop to idle position, a spring detent adapted to hold the stop in idle position, and means whereby the removal of the mold from the press releases the spring detent.

18. In an apparatus for making hollow articles of plastic material, a mold having a cavity, a vent leading therefrom, a valve carried by the mold controlling the vent, said valve having an external handle by which it may be opened or closed, and means for supplying fluid under pressure opposite the cavity while said valve is open, and mechanism engaging the handle of the valve for thereafter closing it.

19. In an apparatus for making hollow articles of plastic material, the combination with a press adapted to support a mold, a chamber in the press having a closed top and an open bottom, a cam adapted to lower said chamber into coaction with the mold, automatically acting mechanism for admitting fluid under pressure to the chamber while lowered, and supports on the opposite sides of the press substantially registering with the mold support therein, whereby molds may be readily conveyed to the press and pressure supplied while therein and thereafter conveyed from the press.

20. In an apparatus of the class described, the combination of means for supporting a cavitary mold, a chamber having a closed top and an open bottom, the edge of the bottom registering with a marginal region of the mold, mechanism for causing the chamber and mold to approach each other to clamp a sheet of plastic stock across the mold face, mechanism then acting to effectively hold the chamber against internal pressure, mechanism for automatically admitting fluid under pressure to said chamber while it is so held, a vent from the mold cavity, a valve for controlling the vent, and mechanism for automatically closing the valve following the admission of fluid under pressure to said chamber.

21. The combination of means for supporting a mold having a vent provided with a shut-off valve, a chamber having an open face of such dimensions that the edge of the chamber may coact with the mold face to clamp a sheet of plastic stock across it, a valved conduit leading to said chamber, and means acting automatically for opening said conduit-valve, for then closing said shut-off valve and for then closing the valve in the conduit and releasing the pressure in the chamber, all during the period of coaction of the chamber and mold.

22. The combination of a cavitary mold, a chamber having a closed top and an open bottom of such dimensions relative to the mold that it may coact with the mold face outside of the cavity, said mold having a vent from the cavity and having an openable and closable valve for controlling said vent, a conduit leading to said chamber, and an openable and closable draining valve in said conduit, mechanism for moving the chamber to coact with the mold, mechanism then acting to hold it in that position, and mechanism for automatically opening the valve in said conduit and for then closing the valve in the mold vent and then closing the valve in the conduit and thereby releasing the internal pressure, all during the time the holding mechanism is acting.

In testimony whereof, I hereunto affix my signature.

ALBERT H. BATES.